(12) United States Patent
Geprägs et al.

(10) Patent No.: US 6,221,983 B1
(45) Date of Patent: *Apr. 24, 2001

(54) DISPERSION POLYMERIZATION IN THE PRESENCE OF METALLOCENE CATALYST

(75) Inventors: Michael Geprägs, Bobenheim-Roxheim; Josef Wünsch, Schifferstadt; Joachim Rösch, Ludwigshafen, all of (DE)

(73) Assignee: BASF Aktiengesellschaft, Ludwigshafen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/068,307
(22) PCT Filed: Oct. 30, 1996
(86) PCT No.: PCT/EP96/04708
§ 371 Date: May 7, 1998
§ 102(e) Date: May 7, 1998
(87) PCT Pub. No.: WO97/18248
PCT Pub. Date: May 22, 1997

(30) Foreign Application Priority Data

Nov. 14, 1995 (DE) .............................. 195 42 356

(51) Int. Cl.$^7$ ....................................... C08F 2/08
(52) U.S. Cl. .................. 526/74; 526/160; 526/169.2; 526/201; 526/347
(58) Field of Search ............... 526/160, 169.2, 526/346, 347, 348, 201, 74

(56) References Cited

U.S. PATENT DOCUMENTS

| | | |
|---|---|---|
| 3,734,978 | 5/1973 | Schwab . |
| 3,770,712 | 11/1973 | Schwab . |
| 4,098,980 * | 7/1978 | Markle et al. .................. 526/201 |
| 4,357,449 * | 11/1982 | Yi ................................. 526/74 |
| 4,474,924 * | 10/1984 | Powers et al. .................. 524/468 |
| 4,794,096 | 12/1988 | Ewen . |
| 5,260,394 * | 11/1993 | Tazaki et al. ................... 526/347 |
| 5,391,671 * | 2/1995 | Tazaki et al. ................... 526/347 |
| 5,543,484 * | 8/1996 | Chung et al. ................... 526/347.1 |
| 5,652,315 * | 7/1997 | Inoue et al. .................... 526/153 |
| 5,670,587 * | 9/1997 | Takeuchi et al. ................ 526/119 |
| 5,703,187 * | 12/1997 | Timmers ........................ 526/282 |
| 5,747,613 * | 5/1998 | Takeuchi et al. ................ 526/134 |
| 5,866,659 * | 2/1999 | Chung et al. ................... 525/279 |
| 5,872,201 * | 2/1999 | Cheung et al. .................. 526/282 |

FOREIGN PATENT DOCUMENTS

| | | |
|---|---|---|
| 284 708 | 10/1988 | (EP) . |
| 361 309 | 4/1990 | (EP) . |
| 416 815 | 3/1991 | (EP) . |
| 72 16541 | 12/1972 | (FR) . |
| 93/03067 | 2/1993 | (WO) . |

OTHER PUBLICATIONS

Du Plooy et al., Organometallics vol. 14, (1995), pp 3129–3131.
Wiesenfeldt et al., J. Organometal Chem. vol. 369 (1989) pp 359–370.
M. Alger, Polymer Science Dictionary, Chapman and Hall, p. 154, 1989.*

* cited by examiner

Primary Examiner—David W. Wu
Assistant Examiner—R. Rabago
(74) Attorney, Agent, or Firm—Keil & Weinkauf

(57) ABSTRACT

The present invention is a process of preparing copolymers of vinyl aromatic and olefinic monomers wherein the polymerization is carried out in a dispersion in the presence of a metallocene catalyst and a dispersion aid. The dispersion aid is a styrene-diene two-block copolymer or a styrene-diene three-block copolymer. The resultant polymer is useful as a fiber, film or molding.

7 Claims, No Drawings

DISPERSION POLYMERIZATION IN THE PRESENCE OF METALLOCENE CATALYST

The present invention relates to a process for preparing copolymers of vinylaromatic and olefinic compounds.

The present invention further relates to the use of the copolymers obtainable in this way for producing fibers, films and moldings and also to the fibers, films and moldings produced therefrom.

Owing to their property profile, copolymers of vinylaromatic and olefinic compounds can be used in many areas, for example as electrical components.

EP-A 416 815 discloses a process for preparing copolymers of vinylaromatic and olefinic compounds, in which the polymerization is carried out in solution. A disadvantage here is that the resulting copolymer can only be isolated by costly removal of the solvent. In addition, the increasing viscosity of the polymerization solution often presents problems.

It is an object of the present invention to provide a novel process for preparing copolymers of vinylaromatic and olefinic compounds, which process does not have the disadvantages mentioned, can, in particular, be carried out simply in process terms, makes it possible for the resulting copolymer to be separated off easily and gives copolymers having a low residual monomer content.

We have found that this object is achieved by a process for preparing copolymers of vinylaromatic and olefinic compounds, wherein the polymerization is carried out in dispersion in the presence of metallocene catalyst systems.

Furthermore, we have found the use of the copolymers obtainable in this way for producing fibers, films and moldings and also the fibers, films and moldings obtainable therefrom.

In the process of the present invention, suitable vinylaromatic compounds are, for example, those of the formula IV

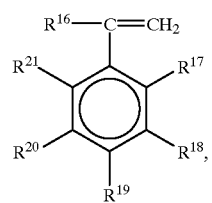

(IV)

where the substituents have the following meanings:

$R^{16}$ is hydrogen or $C_1$–$C_4$-alkyl, $R^{17}$ to $R^{21}$ are, independently of one another, hydrogen, $C_1$–$C_{12}$-alkyl, $C_6$–$C_{18}$-aryl, halogen or two adjacent radicals together form a cyclic group having from 4 to 15 carbon atoms.

Preference is given to using vinylaromatic compounds of the formula IV in which $R^{16}$ is hydrogen and $R^{17}$ to $R^{21}$ are hydrogen, $C_1$–$C_4$-alkyl, chlorine or phenyl or two adjacent radicals together form a cyclic group having from 4 to 12 carbon atoms, so that the compounds of the formula IV are, for example, naphthalene derivatives or anthracene derivatives.

Examples of such preferred compounds are: styrene, p-methylstyrene, p-chlorostyrene, 2,4-dimethylstyrene, 1,4-divinylbenzene, 4-vinylbiphenyl, 2-vinylnaphthalene or 9-vinylanthracene.

It is also possible to use mixtures of various vinylaromatic compounds, but preference is given to using only one vinylaromatic compound.

Particularly preferred vinylaromatic compounds are styrene and p-methylstyrene.

The preparation of vinylaromatic compounds of the formula IV is known per se and is described, for example, in Beilstein 5, 367, 474, 485.

Olefinic compounds which can be used in the process of the present invention are, for example, ethylene or $C_3$–$C_{10}$-alkenes, in particular $C_3$–$C_{10}$-alk-1-enes. Preference is given to ethylene, propylene, 1-butene, isobutene, 4-methylpent-1-ene, 1-hexene, 1-octene and mixtures thereof. Particular preference is given to ethylene.

As metallocene catalyst systems, preference is given to those comprising as active constituents A) metallocene complexes of the formula I

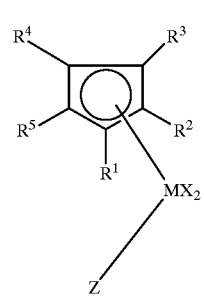

I where the substituents have the following meanings:

M is titanium, zirconium, hafnium, vanadium, niobium or tantalum,

X is fluorine, chlorine, bromine, iodine, hydrogen, $C_1$–$C_{10}$-alkyl, $C_6$–$C_{15}$-aryl, alkylaryl having from 1 to 10 carbon atoms in the alkyl radical and from 6 to 20 carbon atoms in the aryl radical, -$OR^6$ or -$NR^6R^7$, where $R^6$, $R^7$ are $C_1$–$C_{10}$-alkyl, $C_6$–$C_{15}$-aryl, alkylaryl, arylalkyl, fluoroalkyl or fluoroaryl each having from 1 to 10 carbon atoms in the alkyl radical and from 6 to 20 carbon atoms in the aryl radical, $R^1$ to $R^5$ are hydrogen, $C_1$–$C_{10}$-alkyl, 5- to 7-membered cycloalkyl which may in turn bear a $C_1$–$C_{10}$-alkyl group as substituent, $C_6$–$C_{15}$-aryl or arylalkyl, where two adjacent radicals may also together form a cyclic group having from 4 to 15 carbon atoms, or $Si(R^8)_3$ where $R^8$ is $C_1$–$C_{10}$-alkyl, $C_3$–$C_{10}$-cycloalkyl or $C_6$–$C_{15}$-aryl, Z is X or the radicals RS and Z together form a —$R^9$—A— group, where $R^9$ is

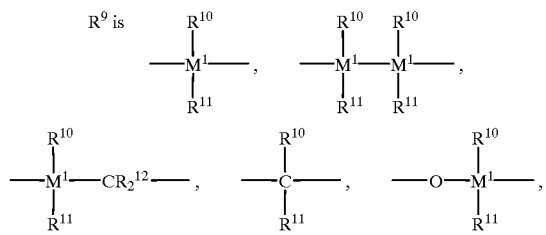

-continued

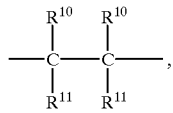

$=BR^{10}$, $=AlR^{10}$, —Ge—, —Sn—, —O—, —S—,
$=SO$,
$=SO_2$, $=NR^{10}$, $=CO$, $=PR^{10}$ or $=P(O)R^{10}$, where $R^{10}$, $R^{11}$ and $R^{12}$ are identical or different and are each a hydrogen atom, a halogen atom, a $C_1$–$C_{10}$-alkyl group, a $C_1$–$C_{10}$-fluoroalkyl group, a $C_6$–$C_{10}$-fluoroaryl group, a $C_6$–$C_{10}$-aryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group or $R^{10}$ and $R^{11}$ or $R^{10}$ and $R^{12}$, in each case together with the atoms connecting them, form a ring, and $M^1$ is silicon, germanium or tin, A is —O—, —S—,

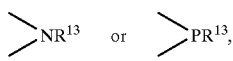

where $R^{13}$ is $C_1$–$C_{10}$-alkyl, $C_6$–$C_{15}$-aryl, $C_3$–$C_{10}$-cycloalkyl, alkylaryl, $Si(R^{14\ 4})_3$,
—$(CH_2)_n$O—$R^{14}$, —$(CH_2$—$CH_2O)_n$$R^{14}$ or —$(CH_2$—O—$)_n$$R^{14}$ where $R^{14}$ is hydrogen, $C_1$–$C_{10}$-alkyl, $C_6$–$C_{15}$-aryl, which may in turn bear $C_1$–$C_4$-alkyl groups as substituents, or $C_3$–$C_{10}$-cycloalkyl and n is 1, 2 or 3 and B) a compound capable of forming metallocenium ions.

Particularly preferred metallocene complexes of the formula I are those in which M is titanium, zirconium or hafnium, in particular titanium, X is chlorine, $C_1$–$C_4$-alkyl or —$OR^6$, where $R^6$ is $C_1$–$C_6$-alkyl, in particular methyl, ethyl, propyl or n-butyl, $R^1$ to $R^5$ are hydrogen, $C_1$–$C_6$-alkyl, in particular methyl, ethyl, propyl, n-butyl or tert-butyl, phenyl or two adjacent radicals together form a cyclic group having from 4 to 15 carbon atoms, z is X or the radicals $R^5$ and Z together form a —$R^9$—A— group, where

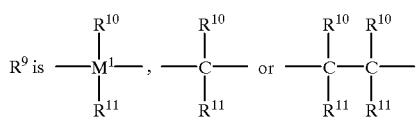

where $R^{10}$ and $R^{11}$ are hydrogen or $C_1$–$C_6$-alkyl and $M^1$ is silicon, A is

where $R^{13}$ is $C_1$–$C_6$-alkyl, in particular methyl, ethyl, propyl, n-butyl or tert-butyl, phenyl or
—$(CH_2)_n$O—$R^{14}$ $R^{14}$ is $C_1$–$C_4$-alkyl, in particular methyl, and n is 2.

Particularly suitable metallocene complexes of the formula I are:
pentamethylcyclopentadienyltitanium trichloride,
pentamethylcyclopentadienyltrimethyltitanium,
pentamethylcyclopentadienyltitanium trimethoxide,
[(methoxyethylamido)dimethylsilyl(tetramethylcyclopentadienyl)]dichlorotitanium,
[(methoxyethylamido)dimethylsilyl(tetramethylcyclopentadienyl)]dimethyltitanium,
[(methoxyethylamido)dimethylsilyl(3-tert-butylcyclopentadienyl)dichlorotitanium,
[methoxyethylamido)dimethylsilyl(3-tert-butylcyclopentadienyl)]dimethyltitanium,
[(methoxyethylamido)dimethylsilyl(cyclopentadienyl)]dichlorotitanium,
[(methoxyethylamido)dimethylsilyl(cyclopentadienyl)]dimethyltitanium,
[(tert-butylamido)dimethylsilyl(tetramethylcyclopentadienyl)]dichlorotitanium.

Mixtures of various metallocene complexes can also be used.

The complexes of the formula I and processes for their preparation are known per se and are described, for example, in Organometallics 1995, Vol. 14, No. 7, pages 3129 to 3131 and in Journal of Organometallic Chemistry, 369 (1989), 359–370.

As compound B) capable of forming metallocenium ions, the catalyst systems can comprise open-chain or cyclic aluminoxane compounds.

Examples of suitable aluminoxane compounds are open-chain or cyclic aluminoxane compounds of the formula II or III

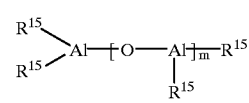

II

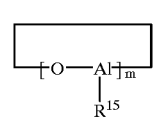

III where $R^{15}$ is a $C_1$–$C_4$-alkyl group, preferably methyl or ethyl, and m is an integer from 5 to 30, preferably from 10 to 25.

The preparation of these oligomeric aluminoxane compounds is usually carried out by reacting a solution of trialkylaluminum with water and is described, for example, in EP-A 284 708 and U.S. Pat. No. 4,794,096.

In general, the oligomeric aluminoxane compounds obtained in this way are in the form of mixtures of both linear and cyclic chain molecules of various lengths, so that m is to be regarded as a mean value. The aluminoxane compounds can also be present in admixture with other metal alkyls, preferably with aluminum alkyls.

It has been found to be advantageous to use the metallocene complexes and the oligomeric aluminoxane compound in such amounts that the atomic ratio of aluminum from the oligomeric aluminoxane compound to the transition metal from the metallocene complexes is in the range from 10:1 to $10^6$:1, in particular in the range from 10:1 to $10^4$:1.

Solvents used for these catalyst systems are usually aromatic hydrocarbons, preferably those having from 6 to 20 carbon atoms, in particular xylenes and toluene and also their mixtures.

As compound B) capable of forming metallocenium ions, it is also possible to use coordination compounds selected from the group consisting of strong, uncharged Lewis acids, ionic compounds containing Lewis acid cations and ionic compounds containing Bronsted acids as cations.

As strong uncharged Lewis acids, preference is given to compounds of formula V $$M^2X^1X^2X^3 \qquad \qquad V$$

where

M² is an element of main group III of the Periodic Table, in particular B, Al or Ga, preferably B, $X^1, X^2$ and $X^3$ are hydrogen, $C_1$–$C_{10}$-alkyl, $C_6$–$C_{15}$-aryl, alkylaryl, arylalkyl, haloalkyl or haloaryl each having from 1 to 10 carbon atoms in the alkyl radical and from 6 to 20 carbon atoms in the aryl radical, or fluorine, chlorine, bromine or iodine, in particular haloaryls, preferably pentafluorophenyl.

Particular preference is given to compounds of the formula V in which $X^1$, $X^2$ and $X^3$ are identical, preferably tris(pentafluorophenyl)borane. These compounds and processes for their preparation are known per se and described, for example, in Suitable ionic compounds containing Lewis acid cations are compounds of the formula VI $$[(Y^{a+})Q_1Q_2\ldots Q_z]^{d+} \qquad \qquad VI$$

where

Y is an element of main groups I to VI or transition groups I to VIII of the Periodic Table, $Q_1$ to $Q_z$ are singly negatively charged groups such as $C_1$–$C_{28}$-alkyl, $C_6$–$C_6$–$C_{15}$-aryl, alkylaryl, arylalkyl, haloalkyl, haloaryl each having from 6 to 20 carbon atoms in the aryl part and from 1 to 28 carbon atoms in the alkyl part, $C_1$–$C_{10}$-cycloalkyl which may bear $C_1$–$C_{10}$-alkyl groups as substituents, halogen, $C_1$–$C_{28}$-alkoxy, $C_6$–$C_{15}$-aryloxy, silyl or mercaptyl groups, a is an integer from 1 to 6, z is an integer from 0 to 5 and d is the difference a–z, but d is greater than or equal to 1.

Particularly suitable Lewis acid cations are carbonium cations, oxonium cations and sulfonium cations and also cationic transition metal complexes. Particular mention may be made of the triphenylmethyl cation, the silver cation and the 1,1'-dimethylferrocenyl cation.

They preferably have non-coordinating counterions, in particular boron compounds as are also mentioned in WO 91/09882, preferably tetrakis(pentafluorophenyl)borate.

Ionic compounds containing Bronsted acids as cations and preferably likewise noncoordinating counterions are mentioned in WO 93/3067; the preferred cation is N,N-dimethylanilinium.

It has been found to be particularly useful for the molar ratio of boron from the compound capable of forming metallocenium ions to transition metal from the metallocene complex to be in the range from 0.1:1 to 10:1, in particular in the range from 1:1 to 5:1.

The process of the present invention is carried out as a dispersion polymerization. Suitable dispersion aids are, for example, styrene-diene two-block copolymers or styrene-diene-styrene three-block copolymers; as dispersion medium, preference is given to aliphatic hydrocarbons.

The dispersion aid is preferably used in an amount of from 1 to 10% by weight, based on the amount of vinylaromatic compounds used. It is advantageously added to the dispersion to be polymerized in the form of a solution in the vinylaromatic monomer.

Suitable two-block copolymers can consist of one polymer block of styrene and one polymer block of butadiene, preferably 1,4-polybutadiene. The sum of the % by weight of the blocks of styrene and those of butadiene is 100, with the composition being able to vary. The styrene block can make up from 10 to 90% by weight, preferably from 20 to 80% by weight, and the butadiene block can correspondingly make up from 90 to 10% by weight, preferably from 80 to 20% by weight. Also suitable are styrene-butadiene two-block copolymers which may be hydrogenated.

Suitable styrene-diene-styrene three-block copolymers are, for example, ones in which the diene block comprises polybutadiene or polyisoprene and the diene block may be hydrogenated or unhydrogenated.

Two-block and three-block copolymers and also processes for their preparation are known per se and are described, for example, in Thermoplastic Elastomers (1987), N. R. Liegge et al (ed.).

Suitable copolymers are also commercially available, for example Kraton® (Shell).

Among the aliphatic hydrocarbons which can be used as dispersion medium, those having from 4 to 10 carbon atoms are particularly useful, for example butane, pentane, hexane and heptane or hydrocarbon mixtures.

In the process of the present invention, the preferred procedure is to dissolve the dispersion aid in the vinylaromatic compound, add the dispersion aid, preferably in an amount of from 1 to 10% by weight, based on the vinylaromatic compound, then pass through the olefinic compound and add the metallocene catalyst system.

The polymerization conditions are not critical; the polymerization is preferably carried out at from 50 to 100° C., at a pressure of from 1 to 5 bar for from 0.5 to 10 hours. The polymerization can be stopped by addition of protic compounds, for example methanol, and the dispersion medium can be removed by increasing the temperature.

Preferably, the amount of vinylaromatic compounds used is in the range from 50 to 1000 ml and the amount of olefinic compounds is in the range from 0.1 to 10 l/min.

The copolymers formed preferably have a proportion of the vinylaromatic compound of from 10 to 90% by weight, in particular from 50 to 75% by weight.

The process of the present invention is simple to carry out in process terms, the resulting copolymers can easily be separated off, preferably by evaporating the dispersion medium which can thus be condensed and recirculated, and the resulting copolymers are obtained in particle form and have a low residual monomer content. The copolymers formed are suitable for producing fibers, films and moldings.

EXAMPLES

Examples 1 and 2

Preparation of Styrene-ethylene Copolymers

Example 1

In a reaction vessel which had been made inert, 5.0 g of a styrene-butadiene two-block copolymer having a styrene content of 40% by weight (hydrogenated) were dissolved as dispersion aid in 100 ml of styrene and the mixture was stirred for 20 minutes at room temperature. Subsequently, 300 ml of pentane were added as dispersion medium and the mixture was stirred further for 20 minutes while passing ethylene through it (flow: 100 l/h). 25 μmol of [(tert-butylamido)dimethylsilyl(tetramethylcyclopentadienyl)] dichlorotitanium II

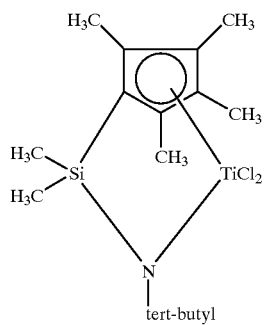

were admixed with 3.3 ml of a 1.53 molar toluene solution of methylaluminoxane and introduced into the reaction vessel. The ethylene flow was maintained during the entire polymerization time. The heat of polymerization liberated (the temperature rose to 35° C.) led to boiling of the pentane. After a polymerization time of 3 hours, the reaction was stopped by addition of 20 ml of methanol and the temperature was increased to 40° C., causing the pentane to evaporate. The resulting copolymer was obtained as powder.

Example 2

The procedure of Example 1 was repeated, but 10.0 g of the styrene-butadiene two-block copolymer and 15 μmol of II were used. The polymerization time was 4 hours.

The properties of the resulting copolymers are shown in the following table.

The styrene content of the copolymer was determined by means of $^{13}$C-NMR, the weight average molecular weights $M_w$ and number average molecular weights $M_n$ were determined by means of gel permeation chromatography and the residual monomer (styrene) content was determined by means of gas chromatography.

TABLE

| Ex. | Yield [g] | Proportion of styrene [% by weight] | $M_w$ | $M_w/M_n$ | Residual monomer content [ppm] |
|---|---|---|---|---|---|
| 1 | 152 | 58 | 180 000 | 2.1 | 62 |
| 2 | 170 | 52 | 210 000 | 2.2 | 48 |

We claim:
1. A process for preparing copolymers of vinylaromatic and olefinic compounds having from 50 to 75% by weight of vinylaromatic compound, wherein the polymerization is carried out in dispersion in the presence of at least one metallocene catalyst system, and wherein styrene-diene two-block copolymers or styrene-diene three-block copolymers are used as dispersion aid, in which the diene block may be hydrogenated or unhydrogenated, and wherein the metallocene catalyst systems used are ones comprising as active constituents

A) metallocene complexes of the formula I

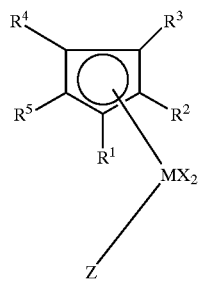

where the substituents have the following meanings:

M is titanium, zirconium, hafnium, vanadium, niobium or tantalum,

X is fluorine, chlorine, bromine, iodine, hydrogen, $C_1$–$C_{10}$-alkyl, $C_6$–$C_{15}$-aryl, alkylaryl having from 1 to 10 carbon atoms in the alkyl radical and from 6 to 20 carbon atoms in the aryl radical, —OR$^6$ or —NR$^6$R$^7$, where R$^6$, R$^7$ are $C_1$–$C_{10}$-alkyl, $C_6$–$C_{15}$-aryl, alkylaryl, arylalkyl, fluoroalkyl or fluoroaryl each having from 1 to 10 carbon atoms in the alkyl radical and from 6 to 20 carbon atoms in the aryl radical, R$^1$ to R$^5$ are hydrogen, $C_1$–$C_{10}$-alkyl, 5- to 7-membered cycloalkyl which may in turn bear a $C_1$–$C_{10}$-alkyl group as substituent, $C_6$–$C_{15}$-aryl or arylalkyl, where two adjacent radicals may also together form a cyclic group having from 4 to 15 carbon atoms, or Si(R$^8$)$_3$ where R$^8$ is $C_1$–$C_{10}$-alkyl, $C_3$–$C_{10}$-cycloalkyl or $C_6$–$C_{15}$-aryl, z is X or the radicals R$^5$ and Z together form a —R$^9$—A— group, where R$^9$ is

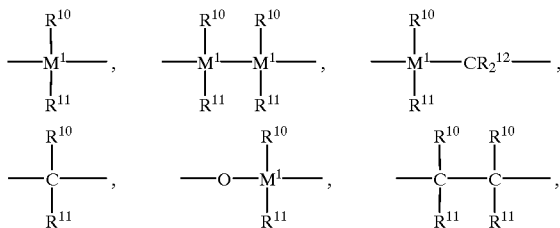

=BR$^{10}$, =AlR$^{10}$, —Ge—, —Sn—, —O—, —S—, =SO, =SO$_2$, =NR$^{10}$, =CO, =PR$^{10}$ or =P(O)R$^{10}$, where R$^{10}$, R$^{11}$ and R$^{12}$ are identical or different and are each a hydrogen atom, a halogen atom, a $C_1$–$C_{10}$-alkyl group, a $C_1$–$C_{10}$-fluoroalkyl group, a $C_6$–$C_{10}$-fluoroaryl group, a $C_6$–$C_{10}$-aryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group or R$^{10}$ and R$^{11}$ or R$^{10}$ and R$^{12}$, in each case together with the atoms connecting them, form a ring, and M$^1$ is silicon, germanium or tin, A is —O—, —S—,

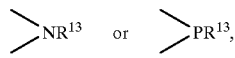

where

R$^{13}$ is C$_1$–C$_{10}$-alkyl, C$_6$–C$_{15}$-aryl, C$_3$–C$_{10}$-cycloalkyl, alkylaryl, Si(R$^{14}$)$_3$, $-\!(CH_2)_n\!O\!-\!R^{14}$, $-\!(CH_2\!-\!CH_2\!-\!O)_n\!R^{14}$ or $-\!(CH_2\!-\!O)_n\!R^{14}$ where R$^{14}$ is hydrogen, C$_1$–C$_{10}$-alkyl C$_6$–C$_{15}$-aryl, which may in turn bear C$_1$–C$_4$-alkyl groups as substituents, or C$_3$–C$_{10}$-cycloalkyl and n is 1, 2 or 3 and B) a compound capable of forming metallocenium ions.

2. A process as claimed in claim 1, wherein the dispersion aid is used in an amount of from 1 to 10% by weight, based on the amount of vinylaromatic compounds used.

3. A process as claimed in claim 1, wherein aliphatic hydrocarbons are used as dispersion medium.

4. A process as claimed in claim 1, wherein the compound B) capable of forming metallocenium ions comprises open-chain or cyclic aluminoxane compounds of the formula II or III

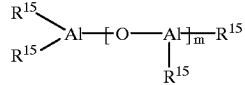

II

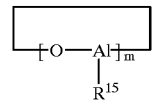

III where

R$^{15}$ is a C$_1$–C$_4$-alkyl group and m is an integer from 5 to 30.

5. A process as claimed in claim 1, wherein the compound B) capable of forming metallocenium ions is a coordination compound selected from the group consisting of strong, uncharged Lewis acids, ionic compounds containing Lewis acid cations and ionic compounds containing Brönsted acids as cations.

6. The process as claimed in claim 1, wherein the residual monomer content is up to 62 ppm.

7. A fiber, film or molding comprising a copolymer prepared as claimed in claim 1.

\* \* \* \* \*